(12) United States Patent
Nakamura

(10) Patent No.: US 6,189,680 B1
(45) Date of Patent: Feb. 20, 2001

(54) ROTARY CONVEYOR

(75) Inventor: Yoshio Nakamura, Nagano (JP)

(73) Assignee: Fujikoshi Kikai Kogyo Kabushiki Kaisha, Nagano (JP)

(*) Notice: Under 35 U.S.C. 154(b), the term of this patent shall be extended for 0 days.

(21) Appl. No.: 09/360,956

(22) Filed: Jul. 27, 1999

(51) Int. Cl.$^7$ ...................................... B65G 29/00
(52) U.S. Cl. ................ 198/468.01; 198/468.4; 198/750.1; 198/750.12
(58) Field of Search ............ 198/468.01, 468.2, 198/468.4, 750.1, 750.11, 750.12, 750.13

(56) References Cited

U.S. PATENT DOCUMENTS

| | | | |
|---|---|---|---|
| 5,085,312 | * | 2/1992 | Ribordy et al. .......... 198/468.2 |
| 5,906,261 | * | 5/1999 | Kok et al. ............. 198/468.2 |
| 5,921,375 | * | 7/1999 | Van Laar ............. 198/468.4 |

FOREIGN PATENT DOCUMENTS 2501763  3/1996  (JP).

\* cited by examiner

Primary Examiner—Christopher P. Ellis
Assistant Examiner—Khoi H. Tran
(74) Attorney, Agent, or Firm—Jordan And Hamburg LLP

(57) ABSTRACT

The rotary conveyor of the present invention has a simple structure and is capable of preventing an electric cable and an air tube from twisting and cutting. In the rotary conveyor, a rotating section can rotate in the both directions. A number N (an integer three or more) of movable stations are provided to the rotating section with regular angular separations (an angle θ1). The movable stations respectively machine work pieces. The number N of fixed stations are provided on the base section and located at positions corresponding on the movable stations. The fixed stations respectively machine the work pieces with the movable stations. The rotating section is intermittently turned the angle θ1 a prescribed number (N−1) of times, in one direction, from an initial position of the rotating section, then the rotating section is continuously turned, in the other direction, until reaching the initial position.

7 Claims, 3 Drawing Sheets

ROTARY CONVEYOR

BACKGROUND OF THE INVENTION

The present invention relates to a rotary conveyor, more precisely relates to a rotary conveyor in which a rotating section can be turned without twisting and entangling electric cables, air tubes, etc.

In some conventional automatic machining lines, rotary conveyors are employed. The rotary conveyor intermittently conveys work pieces in a circumferential direction.

In the conventional rotary conveyor, a plurality of holding units, which are capable of respectively holding the work pieces, are provided in a rotating section with regular angular separations (an angle SA). The rotating section is intermittently turned the angle SA prescribed times so as to intermittently index and convey the work pieces. By employing the rotary conveyor, a plurality of steps for machining the work pieces can be executed simultaneously. The work pieces which have been completely machined are discharged in order. The rotary conveyor can efficiently machine the work pieces. Note that, the rotating section is intermittently and endlessly rotated in one direction only.

A wafer polishing machine disclosed in JP Pat. No. 2501763, which includes the conventional rotary conveyor, will be explained with reference to FIG. 3. The polishing machine polishes outer circumferential faces of wafers.

The polishing machine includes: a rotating section 50 capable of intermittently rotating a prescribed angle; a plurality of swing arms 51 being provided in the rotating section 50 with regular angular separations; a plurality of holding units 52, which are capable of respectively holding the wafers 60 and each of which is provided to a front end of each of the swing arms 51; a wafer loading station 53 which is located at a position corresponding to one of stop positions of the swing arms 51; a first polishing station 54 and a second polishing station 55 which respectively have rotary polishing units for polishing the wafers 60; a wafer unloading station 56; and swing drive units 57, which are respectively provided to the first and second polishing stations 54 and 55 and each of which turns the swing arm 51 located in the polishing station so as to press the outer circumferential face of the wafer 60, which has been held by the holding unit 52, to the rotary polishing unit. Note that, the holding units 50 include means for holding the wafers 60 by air suction, and the holding units 52 holding the wafers 50 can be rotated by rotary drive units 58.

However, in the conventional rotary conveyor, the rotating section is endlessly rotated in one direction only and electric devices and/or pneumatic devices are mounted on the rotating section, so slip rings and/or rotary joints must be required so as to prevent twisting and cutting electric cables and/or air tubes. Namely, the slip rings are used to maintain electric connection and the rotary joints are used to maintain air communication, even if the rotating section is endlessly rotated in the one direction only. By employing the slip rings and rotary joints, a structure of the conventional rotary conveyor must be complex.

Further, in the case of the conventional rotary conveyor for a complex machine, the number of poles of the slip rings must be limited, so a control unit including a sequence must be mounted on the rotating section.

SUMMARY OF THE INVENTION

An object of the present invention is to provide a rotary conveyor which has a simple structure and is capable of preventing an electric cable and/or an air tube from twisting and cutting.

To achieve the object, the rotary conveyor of the present invention comprises:

a base section;

a rotating section being capable of relatively rotating, with respect to the base section, in the both directions about a center shaft thereof;

a drive unit for rotating the rotating section in the both directions;

a number N (N is an integer three or more) of movable stations being provided on the rotating section with regular angular separations, each of which is an angle θ1, the movable stations respectively machining work pieces; and the number N of fixed stations being provided on the base section, the fixed stations being located at positions corresponding to the movable stations, the fixed stations respectively machining the work pieces with the movable stations, wherein the rotating section is intermittently turned the angle θ1 a prescribed number (N−1) of times, in one direction, from an initial position of the rotating section, then the rotating section is continuously turned, in the other direction, until reaching the initial position. By the action of the rotating section, twisting and cutting the cables and tubes can be prevented without slip rings and rotary joints, so the structure of the rotary conveyor can be simpler.

In the rotary conveyor, each of the movable stations may have a holding unit capable of holding the work piece. With this structure, despite each of the movable stations holds the work piece only once, the work piece can be continuously machined in a plurality of the steps.

In the rotary conveyor, one of the fixed stations may be capable of loading and unloading the work pieces. With this structure, efficiency of machining the work pieces can be improved.

In the rotary conveyor, each of the movable stations may have a machining unit for machining the work piece, and each of the fixed stations may have a holding unit capable of holding the work piece. With this structure, the rotary conveyor can be employed in an automatic machining machine.

In the rotary conveyor, each of the movable stations may have an electric device, to which an electric cable is connected. With this structure, twisting and cutting the electric cable can be prevented.

In the rotary conveyor, each of the movable stations may have a pneumatic device, to which an air tube is connected. With this structure, twisting and cutting the air tube can be prevented.

In the rotary conveyor, each of the movable stations may have an electric device, to which an electric cable is connected, and a pneumatic device, to which an air tube is connected. With this structure, twisting and cutting the electric cable and air tube can be prevented.

BRIEF DESCRIPTION OF THE DRAWINGS

Embodiments of the present invention will now be described by way of an example and with reference to the accompanying drawings, in which.

DETAILED DESCRIPTION OF THE PREFERRED EMBODIMENTS

Figure 1:
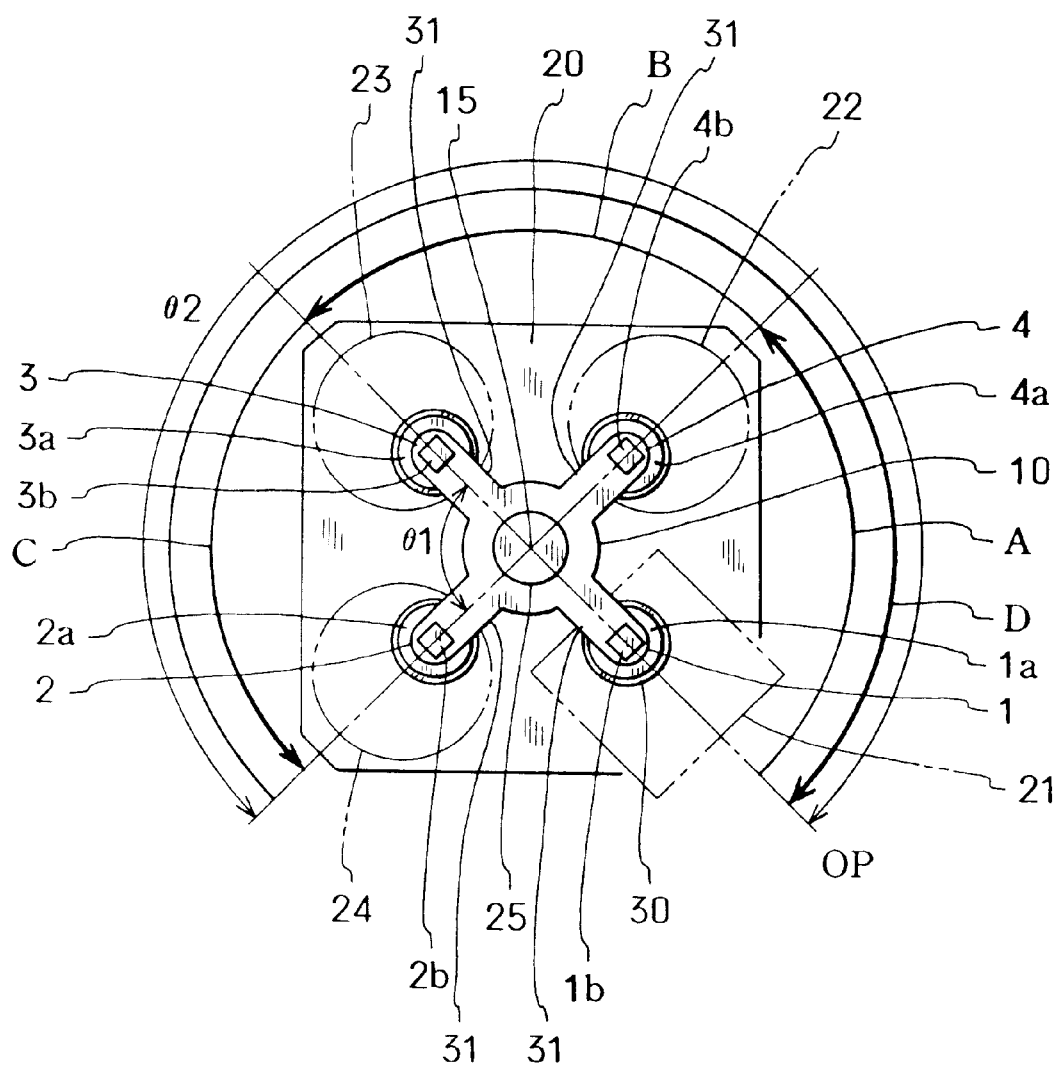
FIG. 1 is a plan view of a rotary conveyor of an embodiment of the present invention.

Preferred embodiments of the present invention will now be described in detail with reference to the accompanying drawings. FIG. 1 is a plan view of a rotary conveyor of the present embodiment, which has four stations; FIGS. 2A–2D are explanation views showing machining steps of the rotary conveyor shown in FIG. 1.

A base section 20 is fixed. The base section 20 may be a floorboard on which the rotary conveyor is installed.

A rotating section 10 has a center shaft 15 and is capable of relatively rotating, with respect to the base section 20, about the shaft 15. In the present embodiment, action of the rotating section 10 is controlled as follows. Firstly, the rotating section 10 is intermittently turned a prescribed angle $\theta 1$ ($\theta 1=360°/N$; N is an integer three or more) a prescribed number (N–1) of times, in one direction from an initial position OP. Then the rotating section 10 is continuously turned a prescribed angle $\theta 2$ ($\theta 2=\theta 1\times(N-1)$), in the other direction, until reaching the initial position OP.

As described above, the angle $\theta 1$ is defined by a following formula:

$$\theta 1=360°/N \text{ (N is a number of machining steps)}$$

In the present embodiment, the number of the machining steps N=4, so the angle $\theta 1=90°$ and N–1=3. Therefore, the rotating section 10 is intermittently turned 90° three times (90°×3=270°) in the counterclockwise direction shown by arrows A, B and C from the initial position OP. Upon turning 270°, then rotating section 10 is continuously turned the angle $\theta 2$ ($\theta 2=270°$), in the clockwise direction shown by an arrow D, until reaching the initial position OP.

Note that, the number of the machining steps N is the integer three or more, so the number N–1 is also a plural number.

A drive unit 25 rotates or turnes the rotating section 10 in the both directions. The drive unit 25 may be, for example, a servo motor. By employing the servo motor, the rotating section 10 can be precisely turned and located at predetermined positions. Further, rotational angle and rotational direction of the rotating section 10 can be controlled by a control unit, Note that, other mechanisms, e.g., cylinder units, may be employed, instead of the servo motor, as the drive unit.

There are four movable stations for the machining steps: a first movable station 1; a second movable station 2; a third movable station 3; and a fourth movable station 4. The number of the movable stations 1, 2, 3 and 4 is equal to the number N (=4).

The movable stations 1, 2, 3 and 4 are provided to the rotating section 10 with regular angular separations, each of which is equal to the angle $\theta 1$ (=90°). Each of the movable stations 1, 2, 3 and 4 is provided to a front end of each arm 31. The movable stations 1, 2, 3 and 4 respectively machine work pieces 30.

Note that, the movable stations 1, 2, 3 and 4 may be provided to mid portions of the arms 31 instead of the front ends thereof.

There are four fixed stations for the machining steps: a first fixed station 21; a second fixed station 22; a third fixed station 23; and a fourth fixed station 24. The number of the fixed stations 21, 22, 23 and 24 is also equal to the number N (=4). The fixed stations 21, 22, 23 and 24 are fixed on the base section 20 and located at positions, which are respectively correspond to stop positions of the movable stations 1, 2, 3 and 4. The fixed stations 21, 22, 23 and 24 machine the work pieces 30 with the movable stations 1, 2, 3 and 4.

The movable stations 1, 2, 3 and 4 respectively have holding units 1a, 2a, 3a and 4a, each of which is capable of holding the work piece 30. Each work piece 30 is held by one of the holding units 1a, 2a, 3a and 4a and machined at the four fixed stations in order. Therefore, machining efficiency can be improved.

The movable stations 1, 2, 3 and 4 respectively have electric and/or pneumatic device 1b, 2b, 3b and 4b to which electric cables and/or air tubes are connected. But the rotating section 10 is turned within 360° and is not continuously rotated, so that the electric cables and/or air tubes are not twisted and cut. Therefore, no slip rings and/or no rotary joints are required, and the structure of the rotary conveyor can be simpler.

The action of the rotary conveyor shown in FIG. 1 will be explained with reference to FIG. 2.

Figure 2A:
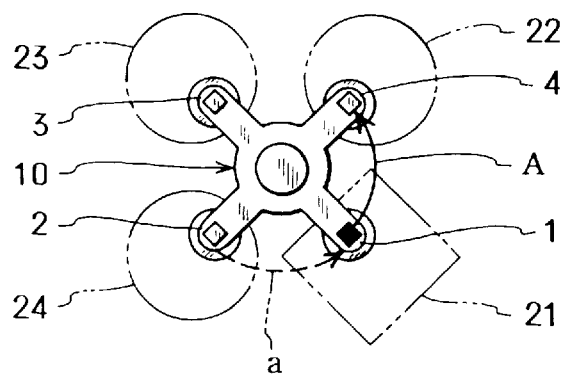
FIGS. 2A–2D are explanation views showing action of the rotary conveyor shown in FIG. 1.

FIG. 2A is a plan view of a state in a first machining step, in which: the rotating section 10 is angularly located at the initial position OP; the first movable station 1 corresponds to the first fixed station 21; the fourth movable station 4 corresponds to the second fixed station 22; the third movable station 3 corresponds to the third fixed station 23; and the second movable station 2 corresponds to the fourth fixed station 24.

Figure 2B:
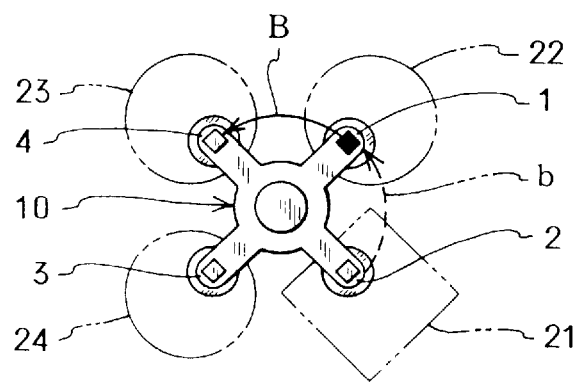

FIG. 2B is a plan view of a state in a second machining step, in which: the rotating section 10 has been turned 90° (the angle $\theta 1$) in the counterclockwise direction (see the arrow A) from the state shown in FIG. 2A; the second movable station 2 corresponds to the first fixed station 21; the first movable station 1 corresponds to the second fixed station 22; the fourth movable station 4 corresponds to the third fixed station 23; and the third movable station 3 corresponds to the fourth fixed station 24.

Figure 2C:
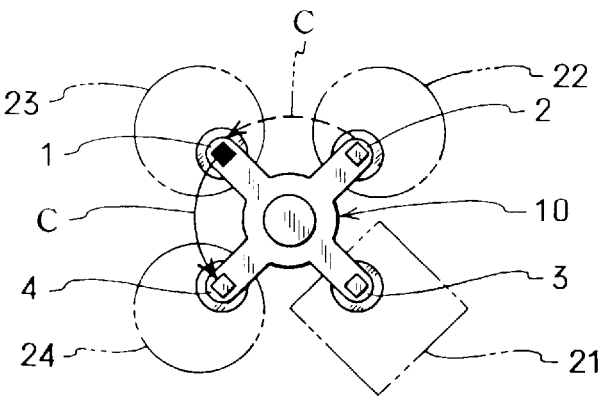

FIG. 2C is a plan view of a state in a third machining step, in which: the rotating section 10 has been turned 90° (the angle $\theta 1$) in the counterclockwise direction (see the arrow B) from the state shown in FIG. 2B; the third movable station 3 corresponds to the first fixed station 21; the second movable station 2 corresponds to the second fixed station 22; the first movable station 1 corresponds to the third fixed station 23; and the fourth movable station 4 corresponds to the fourth fixed station 24.

Figure 2D:
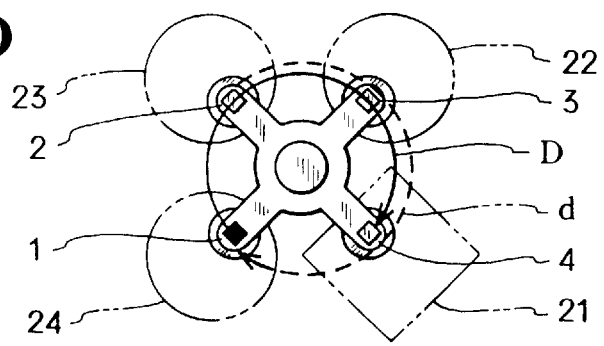
Figure 3:
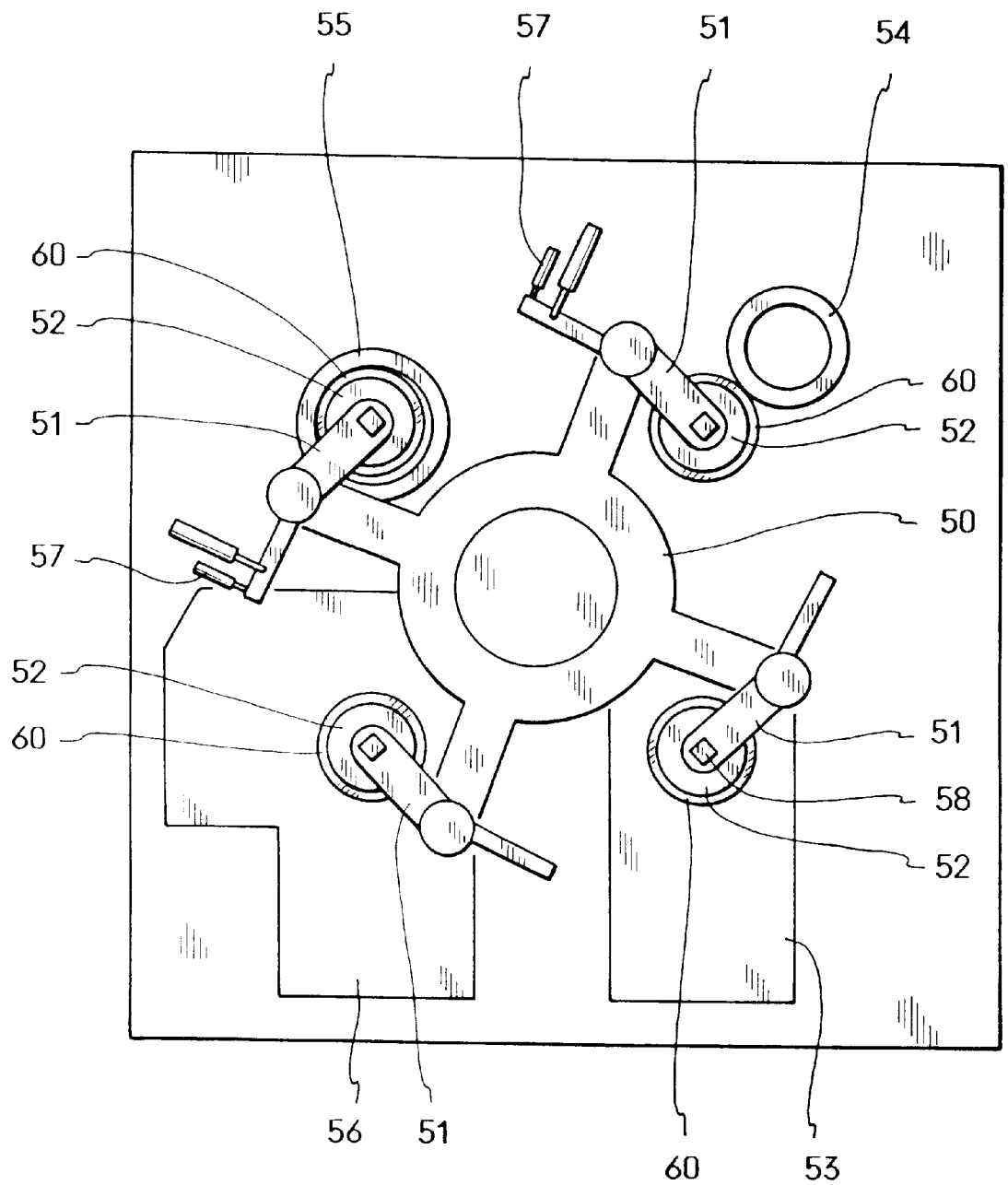
FIG. 3 is a plan view of a conventional rotary conveyor.

FIG. 2D is a plan view of a state in a fourth machining step, in which: the rotating section 10 has been turned 90° (the angle $\theta 1$) in the counterclockwise direction (see the arrow C) from the state shown in FIG. 2C; the fourth movable station 4 corresponds to the first fixed station 21; the third movable station 3 corresponds to the second fixed station 22; the second movable station 2 corresponds to the third fixed station 23; and the first movable station 1 corresponds to the fourth fixed station 24.

Upon completing the fourth machining step shown in FIG. 2D, then the rotating section 10 turns 270° ($\theta 2$) in the clockwise direction (see the arrow D) until reaching the state shown in FIG. 2A.

At the beginning of the machining cycle, the work piece 30 is held (air-chucked) at the first fixed station 21; the completely machined work piece 30 is released at the first fixed station 21.

When the first movable station 1 corresponds to the first fixed station 21, the first movable station 1 begins the first machining step (see FIG. 2A). Then the first movable station 1 is turned, as shown by the arrows A, B and C, in order so as to execute the second machining step (see FIG. 2B, the third machining step (see FIG. 2C) and the fourth machining step (see FIG. 2D). Then the first movable station 1 returns to the first fixed station 21 as shown by the arrow D. By repeating this cycle, the first movable station 1 can machine the work pieces 30 as well as the conventional rotary conveyor in which the swing arm(s) is endlessly rotated in one direction only.

When the second movable station 2 corresponds to the first fixed station 21, the second movable station 2 begins the first machining step (see FIG. 2B). Then the second movable station 2 is turned, as shown by arrows b, c and d, in order so as to execute the second machining step (see FIG. 2C), the third machining step (see FIG. 2D) and the fourth machining step (see FIG. 2A). Then the second movable station 2 returns to the first fixed station 21 as shown by an arrow a. By repeating this cycle, the second movable station 2 can machine the work pieces 30 as well as the conventional rotary conveyor in which the swing arm(s) is endlessly rotated in one direction only.

The third movable station 3 and the fourth movable station 4 are also controlled to repeat the action shown in FIGS. 2A–2B as well as the first movable station 1 and the second movable station 2, so that the third movable station 3 and the fourth movable station 4 too can machine the work pieces 30 as well as the conventional rotary conveyor.

In the rotary conveyor of the present embodiment, the rotating section 10 is not turned 360° or more, but work pieces can be conveyed as well as the conventional rotary conveyor. By employing the rotary conveyor of the present embodiment, the work pieces in each machining step can be simultaneously machined.

In the present embodiment, the work pieces 30 can be conveyed without turning the rotating section 10 360° or more, so that the electric cables and/or air tubes are not twisted, entangled and cut, even if no slip rings and/or rotary joints are employed. Therefore, the structure of the rotary conveyor can be simpler and manufacturing cost can be reduced.

Note that, a stopper mechanism, which limits a rotational angle of the rotating section 10, may be employed as a safety mechanism.

In the above described embodiment, the work piece 30 is held and released at the first fixed station 21. The present invention is not limited to the embodiment, so the work piece 30 may be held and released at any fixed stations. For example, if the work pieces 30 are held and released at the fourth fixed station 24, one cycle of the machining steps will be executed in order of the states shown in FIGS. 2D, 2A, 2B, 2C, 2D. In this case, the first movable station 1 is turned 270° after completing the machining step at the fourth fixed station 24 (see FIG. 2D), then the first movable station 1 is turned 90° three times. By repeating this cycle, the rotary conveyor can continuously convey the work pieces. In this case too, the rotary conveyor can convey the work pieces as well as the conventional rotary conveyor in which the swing arm(s) is endlessly rotated in one direction only.

Successively, a wafer polishing machine including the rotary conveyor shown in FIGS. 1 and 2A–2D will be explained.

In the case of the wafer polishing machine in which wafers are polished one by one, the first fixed station 21 includes a loading unit for loading and unloading the wafer; the second fixed station 22 includes a wafer polishing unit for primary polishing; the third fixed station 23 includes a wafer polishing unit for secondary polishing; and the fourth fixed station 24 included a wafer polishing unit for final polishing. Note that, each polishing unit comprises: a polishing plate, which polishes a surface of the wafer with liquid polishing agent (slurry); and a drive unit which relatively moves the polishing plate with respect to the wafer.

The movable stations 1, 2, 3 and 4 respectively have wafer holding units, which are capable of respectively holding the wafers. The wafers are respectively held the holding units by water-adhesion or air suction. Further, each of the movable stations 1, 2, 3 and 4 has: means for moving the holding unit close to and away from the polishing plate so as to polish the wafer held by the holding unit; means for pressing the wafer held by the holding unit onto the polishing plate, e.g., an air bag; means for rotating the holding unit holding and pressing the wafer onto the polishing plate; and sensors.

Electric and/or pneumatic devices 1b, 2b, 3b and 4b, to which electric cables and/or air tubes are directly connected without slip rings and/or rotary joints, are respectively mounted on the movable stations 1, 2, 3 and 4. But the devices 1b, 2b, 3b and 4b are circumferentially moved within 360°, so that no electric cables and/or air tubes are twisted and entangled. Therefore, the rotary conveyor of the present polishing machine can include no slip rings and/or rotary joints. With this feature, the structure of the rotary conveyor can be simpler, and reliability thereof can be improved because number of abrasive parts can be reduced.

In the above described embodiments, the movable stations 1, 2, 3 and 4 are respectively provided to the front ends of the arms 31 and located above the fixed stations 21, 22, 23 and 24, but the present invention is not limited to the embodiments. For example, the movable stations 1, 2, 3 and 4 may be located under the fixed stations 21, 22, 23 and 24. And, the moving section 10 including the movable stations 1, 2, 3 and 4 may be formed into a circular disc.

In the above described embodiments, the movable stations 1, 2, 3 and 4 respectively have the holding units. But, the fixed stations 21, 22, 23 and 24 may respectively have the holding units, and the movable stations 1, 2, 3 and 4 may respectively have means for machining the work pieces 30. In this case, means for transferring the work pieces 30 between the fixed stations 21, 22, 23 and 24 will be required so as to efficiently execute machining steps.

Note that, a drill for boring holes, a chambering unit, a tapping unit, a transferring unit for transferring work pieces, etc. may be employed as the means for machining work pieces.

In the above described embodiments, the rotary conveyor has four movable stations and four fixed stations due to four machining steps. In the present invention, number of the movable stations and fixed stations may be three, or five or more. Even if the number of the stations (machining steps) is three, or five or more, the same effects can be gained.

The rotary conveyor of the present invention may be widely applied to other fields, e.g., a food processing machine. The rotary conveyor may be applied to a lapping machine, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefor intended to be embraced therein.

What is claimed is:

1. A rotary conveyor, comprising:

a base section;

a rotating section being capable of relatively rotating, with respect to said base section, in the both directions about a center shaft thereof;

a drive unit for rotating said rotating section in the both directions;

a number N (N is an integer three or more) of movable stations being provided on said rotating section with regular angular separations, each of which is an angle θ1, said movable stations respectively holding or machining work pieces; and a number N of fixed stations being provided to said base section, said fixed stations being located at positions corresponding to said movable stations, said fixed stations respectively machining or holding the work pieces with said movable stations, wherein said rotating section is intermittently turned in increment of said angle θ1, a prescribed number (N−1) of times, in one direction, from an initial position of said rotating section, then said rotating section is continuously turned, in the other direction, until reaching the initial position.

2. The rotary conveyor according to claim 1, wherein each of said movable stations has a holding unit capable of holding the work piece.

3. The rotary conveyor according to claim 2, wherein one of said fixed stations is capable of loading and unloading the work pieces.

4. The rotary conveyor according to claim 1, wherein each of said movable stations has a machining unit for machining the work piece, and each of said fixed stations has a holding unit capable of holding the work piece.

5. The rotary conveyor according to claim 1, wherein each of said movable stations has an electric device, to which an electric cable is connected.

6. The rotary conveyor according to claim 1, wherein each of said movable stations has a pneumatic device, to which an air tube is connected.

7. The rotary conveyor according to claim 1, wherein each of said movable stations has an electric device, to which an electric cable is connected, and a pneumatic device, to which an air tube is connected.

* * * * *